United States Patent [19]
Iwakawa et al.

[11] Patent Number: 5,841,881
[45] Date of Patent: Nov. 24, 1998

[54] LABEL/WINDOW POSITION DETECTING DEVICE AND METHOD OF DETECTING LABEL/WINDOW POSITION

[75] Inventors: Masato Iwakawa, Tokyo; Tomoaki Fukano, Kanagawa; Hiroyuki Mutoh, Tokyo, all of Japan

[73] Assignee: NEC Corporation, Tokyo, Japan

[21] Appl. No.: 532,974

[22] Filed: Sep. 22, 1995

[30] Foreign Application Priority Data

Sep. 22, 1994 [JP] Japan .................................. 6-227624

[51] Int. Cl.$^6$ ................................................. G01N 21/86
[52] U.S. Cl. .................. 382/101; 209/584; 250/559.08; 382/266
[58] Field of Search .................... 382/101, 151, 382/266, 143, 264, 258; 209/584, 581; 250/559.08, 559.26, 559.36

[56] References Cited

U.S. PATENT DOCUMENTS

| | | | |
|---|---|---|---|
| 4,158,835 | 6/1979 | Miura et al. | 382/101 |
| 4,782,238 | 11/1988 | Radl et al. | 250/559.36 |
| 4,845,761 | 7/1989 | Cate et al. | 382/101 |
| 4,886,596 | 12/1989 | Sasage et al. | 209/539 |
| 4,965,829 | 10/1990 | Lemelson | 382/101 |
| 4,998,626 | 3/1991 | Ota | 382/102 |
| 5,153,443 | 10/1992 | Nishijima et al. | 250/559.36 |
| 5,293,431 | 3/1994 | Hayduchok et al. | 382/101 |

FOREIGN PATENT DOCUMENTS 528309   2/1993   Japan .

OTHER PUBLICATIONS

Ernst, "Einführung in die digitale Bildverarbeitung: Grundlagen und industrieller Einsatz mit zahlreichen Beispielen" [Introduction into Digital Image Processing: Fundamentals and Industrial Applicability with Numerous Examples], Franzis–Verlag GmbH 1991, pp. 292–295.

Primary Examiner—David K. Moore
Assistant Examiner—Brian P. Werner
Attorney, Agent, or Firm—Sughrue, Mion, Zinn, Macpeak & Seas, PLLC

[57] ABSTRACT

A label/window position detecting device includes a conveyor, light-emitting elements, a lens, linear image sensors, image processors, and coordinate calculation units. The conveyor conveys a target object having a label/window. The light-emitting elements illuminate the target object which is being conveyed by the conveyor. The lens forms an image of the target object illuminated with the light-emitting elements. The linear image sensors photoelectrically convert image light incident through the lens into image signals. The image processors binarize the image signals obtained from the linear image sensors into monochrome binary image signals, using a predetermined threshold. The coordinate calculation units calculate a label/window position of the target object on the basis of the binary image signals from the image processors, which correspond to a label/window edge portion. A method of detecting a label/window position is also disclosed.

12 Claims, 11 Drawing Sheets

LABEL/WINDOW POSITION DETECTING DEVICE AND METHOD OF DETECTING LABEL/WINDOW POSITION

BACKGROUND OF THE INVENTION

The present invention relates to a label/window position detecting device suitable for detecting the address description position of postal matter in an optical character reading apparatus, and a method of detecting a label/window position.

Figure 13:
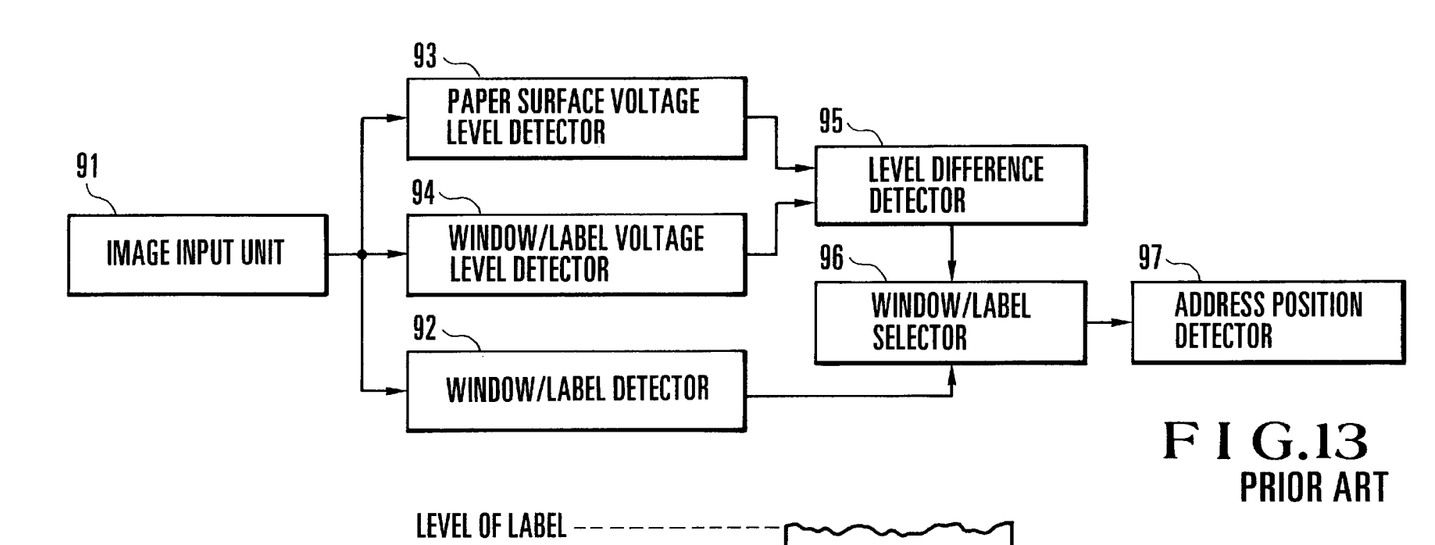
FIG. 13 is a block diagram of a conventional envelope address detecting device.
Figure 14:
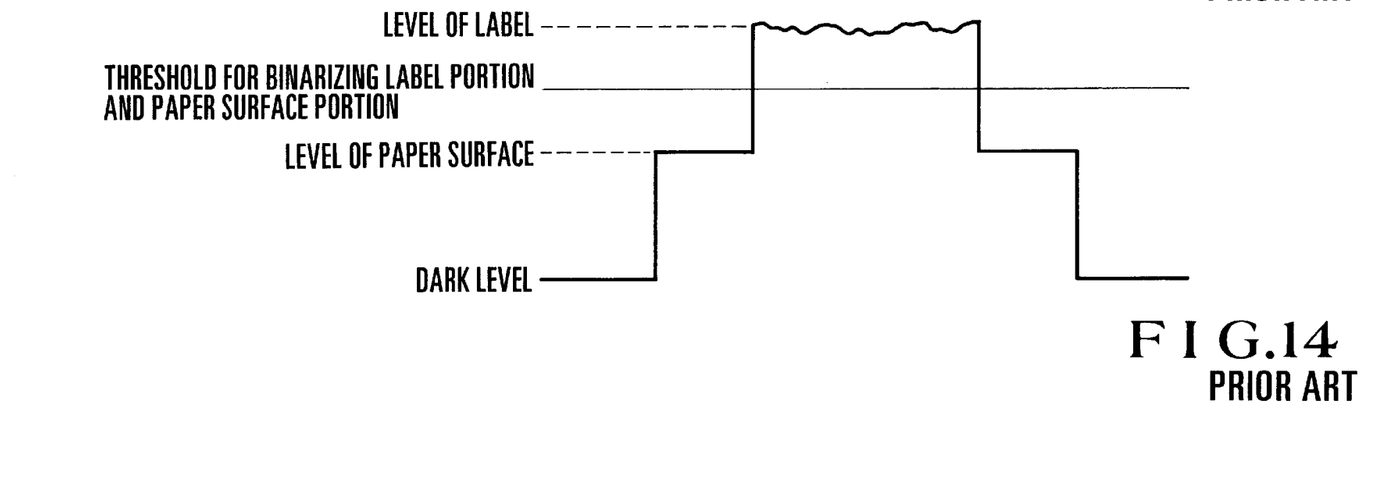
FIG. 14 is a chart of a video signal from an envelope whose paper surface portion input from an image input unit shown in FIG. 13 has a low reflectance.

An "ADDRESS POSITION DETECTOR FOR MAIL" described in Japanese Patent Laid-Open No. 5-28309 is a typical conventional label/window position detecting device of this type. This prior art will be described with reference to FIGS. 13 and 14. FIG. 13 shows the arrangement of the conventional address detecting device, and FIG. 14 shows the levels of a video signal from postal matter whose paper surface portion input from an image input unit in FIG. 13 has a low reflectance. Referring to FIG. 13, the video signal obtained from an image input unit 91 exhibits a level corresponding to the reflectance of the paper surface and the reflectances of the window and label. This video signal is binarized with an appropriate threshold in a window/label detector 92 to detect a window/label position, as shown in FIG. 14.

When the level of the paper surface is close to the level of the label, erroneous detection may be caused by noise. For this reason, the level of the paper surface portion and the level of the window/label portion are detected by a paper surface voltage level detector 93 and a window/label voltage level detector 94, respectively, and then a difference between these levels is detected by a level difference detector 95. Only when the level difference detected by the level difference detector 95 is a predetermined value or more, a window/label selector 96 selects the detection result from the window/label position detector 92. The window/label position detection result from the window/label selector 96 is output to an address position detector 97. The address position detector 97 detects the address description position in accordance with the detection result from the window/label position detector 92.

In postal matter, an address such as the residence and name of an addressee is generally described on a window/label. The position of the window/label is detected to improve the read precision of the address. More specifically, the address of postal matter is generally read in (1) a residence description area detection step, (2) a character extraction step, and (3) a character recognition step. As described above, the residence and name of an addressee are described in the window/label of the postal matter. Therefore, the position of the window/label of the postal matter is detected to improve the precision of "(1) the residence description area detection" to improve the precision of address reading.

In the conventional postal matter address detecting device of this type, when a level difference is not present between the window/label portion and the paper surface portion, i.e., when the reflectance of the label is equal to that of the paper surface, the window/label selector always discards window/label position information. The label position cannot be detected, posing a problem on the principle of detection. It is possible to detect, e.g., a white label adhered to a brown envelope. However, a label having the same color as that of a white envelope, i.e., a white label adhered to the white envelope cannot be detected.

SUMMARY OF THE INVENTION

It is an object of the present invention to provide a label position detecting device capable of detecting the position of a label even if the reflectance of the background of an envelope is almost equal to that of the label, and a method of detecting a label/window position.

In order to achieve the above object of the present invention, there is provided a label/window position detecting device comprising convey means for conveying a target object having a label/window, light-emitting means for illuminating the target object which is being conveyed by the convey means, optical means for forming an image of the target object illuminated with the light-emitting means, photoelectric converting means for photoelectrically converting image light incident through the optical means into an image signal, image processing means for binarizing the image signal obtained from the photoelectric converting means into a monochrome binary image signal, using a predetermined threshold, and label/window position calculating means for calculating a label/window position of the target object on the basis of the binary image signal from the image processing means, which corresponds to a label/window edge portion.

DESCRIPTION OF THE PREFERRED EMBODIMENTS

The present invention will be described in detail with reference to the preferred embodiments.

Figure 1:
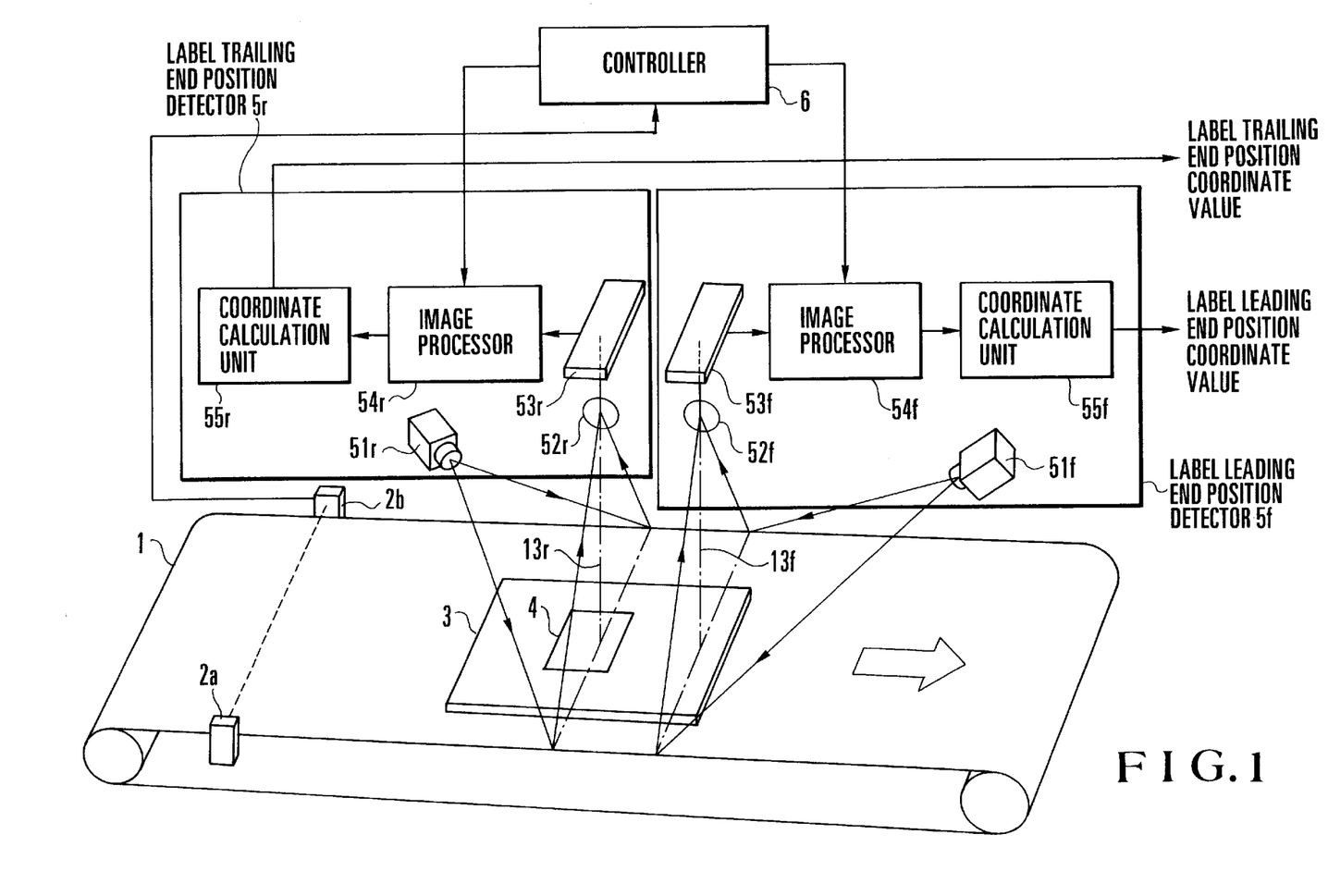
FIG. 1 is a block diagram showing a label position detecting device according to the first embodiment of the present invention.

FIG. 1 shows a label position detecting device according to the first embodiment of the present invention. The present invention is applied to postal matter in which a white label is adhered to a white envelope in FIG. 1. Referring to FIG. 1, postal matter (to be referred to as an envelope hereinafter) 3 such as an envelope is conveyed on a conveyor 1 in a direction indicated by a hollow arrow. Photoelectric detectors 2a and 2b arranged at opposing side portions of the conveyor 1 to detect passage of the envelope 3 conveyed along the conveyor 1 and supplies an image reception timing signal to a controller 6.

A label leading end position detector 5f and a label trailing end position detector 5r detect the leading and trailing end positions of a label 4 adhered to the envelope 3 and output label leading and trailing end position coordinate values, respectively. The controller 6 receives the detection signals from the photoelectric detectors 2a and 2b as trigger signals to control various processing operations including image reception at the label leading and trailing end position detectors 5f and 5r.

The label leading end position detector 5f has a light-emitting element 51f as a light source for irradiating the envelope 3. An image obtained by irradiating light from the light-emitting element 51f onto the envelope is focused by a lens 52f and photoelectrically converted by a linear image sensor 53f. The photoelectrically converted image signal from the linear image sensor 53f is converted into a binary (monochrome) image by an image processor 54f. The binary image is input to a coordinate calculation unit 55f, thereby calculating the coordinate value of the leading end of the label.

The label trailing end position detector 5r has an arrangement identical to that of the label leading end position detector 5f. More specifically, the label trailing end position detector 5r comprises a light-emitting element 51r, a lens 52r, a linear image sensor 53r, an image processor 54r, and a coordinate calculation unit 55r. The label trailing end position detector 5r is different from the label leading end position detector 5f in that the irradiation direction of light from the light-emitting element 53r to the envelope 3 is reversed by 180° with respect to an optical axis 13f of the lens 52f at the label leading end position detector 5f (i.e. optical axis 13r.

An operation of this embodiment will be described with reference to FIGS. 2A and 2B to FIG. 7. Note that the operation of the label leading end position detector 5f is identical to that of the label trailing end position detector 5r, so that only the label leading end position detector 5f will be exemplified.

The envelope 3 with the label 4 is conveyed by the conveyor 1 in the direction indicated by the hollow arrow. The photoelectric detectors 2a and 2b detect passage of the envelope 3 and send passage signals to the controller 6.

Light emitted from the light-emitting element 51f is reflected by the envelope 3 during conveyance, and this reflected light is focused by the lens 52f. The focused light is photoelectrically converted by the linear image sensor 53f. The optical axis 13f of the lens 52f is perpendicular to the surface of the conveyor 1 such that the visual field position is not deviated even if the height of the envelope 3 varies.

Figure 2A:
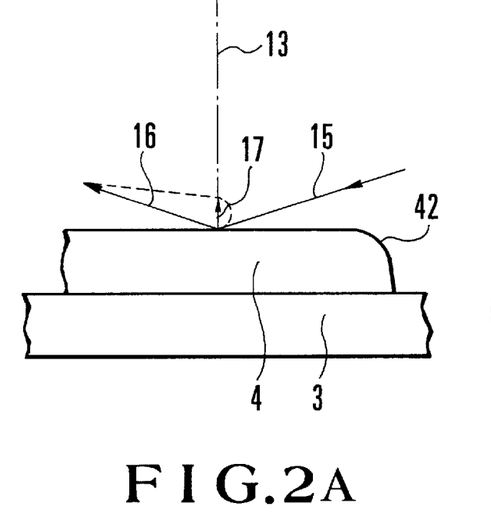
FIGS. 2A and 2B are enlarged views showing the edge portion of a label in a state wherein the label on an envelope which is being conveyed reaches the position of the optical axis of a lens.
Figure 2B:
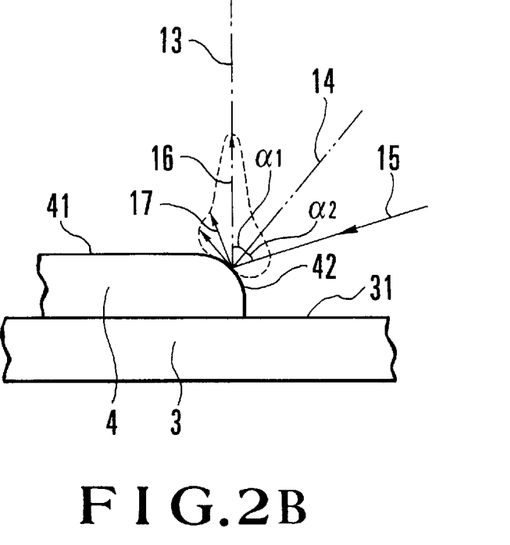

A step is formed by a thickness of the label 4, as shown in FIG. 2A, at the leading end of the label 4 adhered to the envelope 3. A normal 14 to a small curved surface of an edge portion 42 of the label 4 gradually changes from an almost horizontal state to a vertical state with respect to an envelope surface 31 or a label surface 41 during conveyance of the envelope 3. During this change, there necessarily appears a point at which an angle formed between the optical axis 13 of the lens and the normal 14 to the reflecting surface is set equal to that formed between illumination light 15 and the normal 14 ($\alpha 1 = \alpha 2$), as shown in FIG. 2B.

At this time, light 16 regularly reflected by the edge portion 42 of the label 4 is incident on the linear image sensor 53f. At a timing except for this timing, i.e., when the angle between the optical axis 13 and the normal 14 of the reflecting surface is not equal to that between the illumination light 15 and the normal 14 ($\alpha 1 \neq \alpha 2$), light 17 scattered from the label surface 41 and the envelope surface 31 is incident on the linear image sensor 53f. Therefore, the step portion of the label 4, i.e., the edge portion 42 of the label 4 can be detected as a highlight region brighter than the background of the envelope as follows.

Figure 3A:
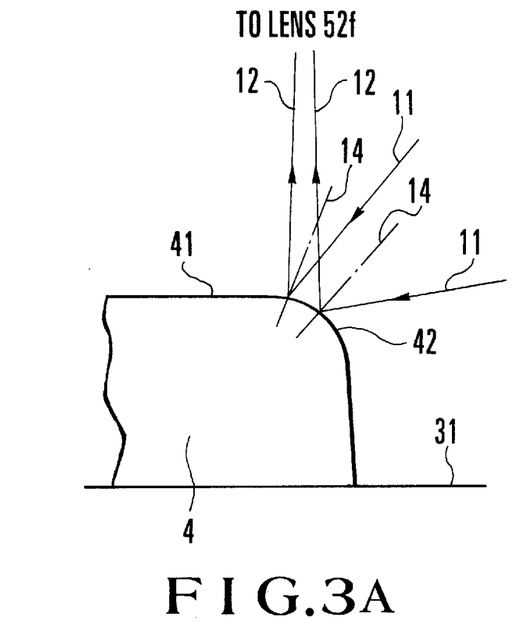
FIGS. 3A and 3B are views for explaining states of reflection at the edge portion of the label when beams emitted from a light-emitting element in FIG. 1 are respectively converged and diverged.
Figure 3B:
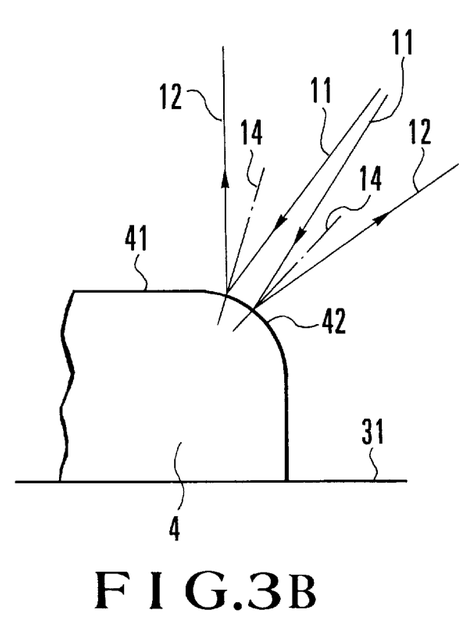

A beam 11 emitted from the light-emitting element 51f is preferably a convergent beam, as shown in FIG. 3A. In this case, a beam 12 reflected by the edge portion 42 of the label 4 is converged toward the direction of the lens 52f. As a result, as compared with the emitted beam 11 as divergent or parallel light, the signal level of the highlight region can increase, as shown in FIG. 3B.

Figure 4:
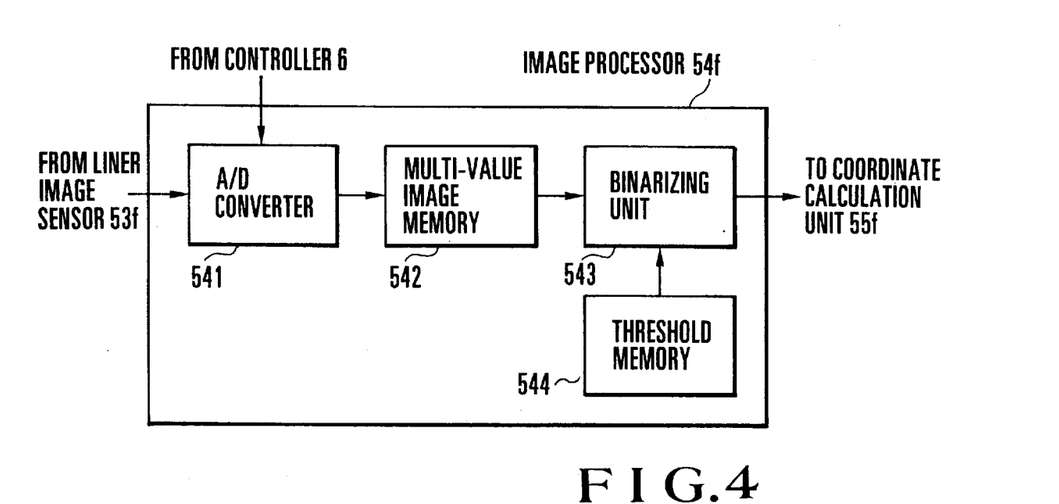
FIG. 4 is a block diagram showing an arrangement of an image processor shown in FIG. 1.

The controller 6 uses the passage signals from the photoelectric detectors 2a and 2b as start trigger signals and outputs an image reception start signal to the image processor 54f when a predetermined appropriate time required for receiving the image of the envelope 3 has elapsed. Referring to FIG. 4, the image signal obtained from the linear image sensor 53f is received by the image processor 54f using the image reception start signal from the controller 6 as a trigger signal. The received image signal is quantized by an A/D converter 541 constituting the image processor 54f. The resultant digital signal is stored in a gray scale (multi-value) image memory 542.

Figure 5A:
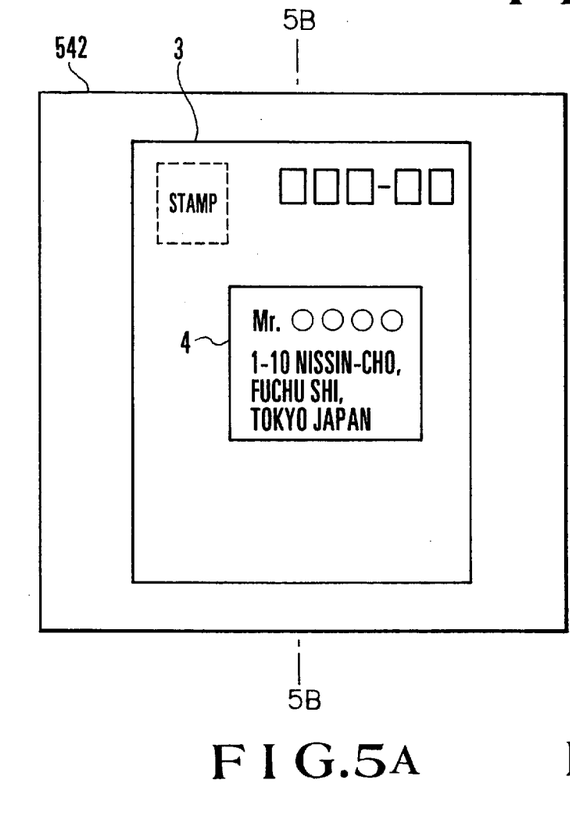
FIG. 5A is a view showing envelope image data stored in a multi-value image memory in FIG. 4.
Figure 5B:
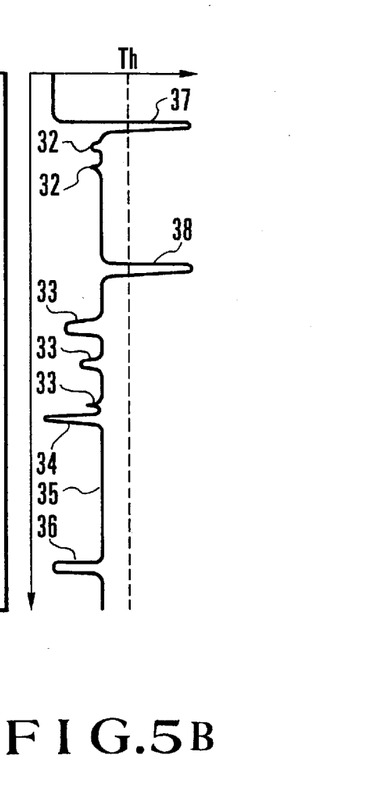
FIG. 5B is a profile showing signal levels on the 5B—5B line in FIG. 5A.

As shown in FIG. 5B, a signal 33 representing a character portion, a signal 32 representing a postal code frame portion, a signal 34 representing the trailing end portion of the edge portion of the label 4, and a signal 36 representing the trailing end portion of the envelope have lower levels than that of a signal 35 representing the flat portions of the envelope and the label 4. On the other hand, a signal 37 representing the leading end portion of the envelope and a signal 38 representing the leading end portion of the edge portion of the label 4 have higher levels than that of the signal 35 representing the flat portions of the envelope 3 and the label 4.

A threshold Th higher than the signal level of the signal 35 representing the flat portions of the envelope 3 and the label 4 is preset in a threshold memory 544 shown in FIG. 4. The quantized image signal stored in the multi-value image memory 542 is binarized by a binarizing unit 543 using the threshold Th stored in the threshold memory 544. The result is output to the coordinate calculation unit 55f.

Figure 6:
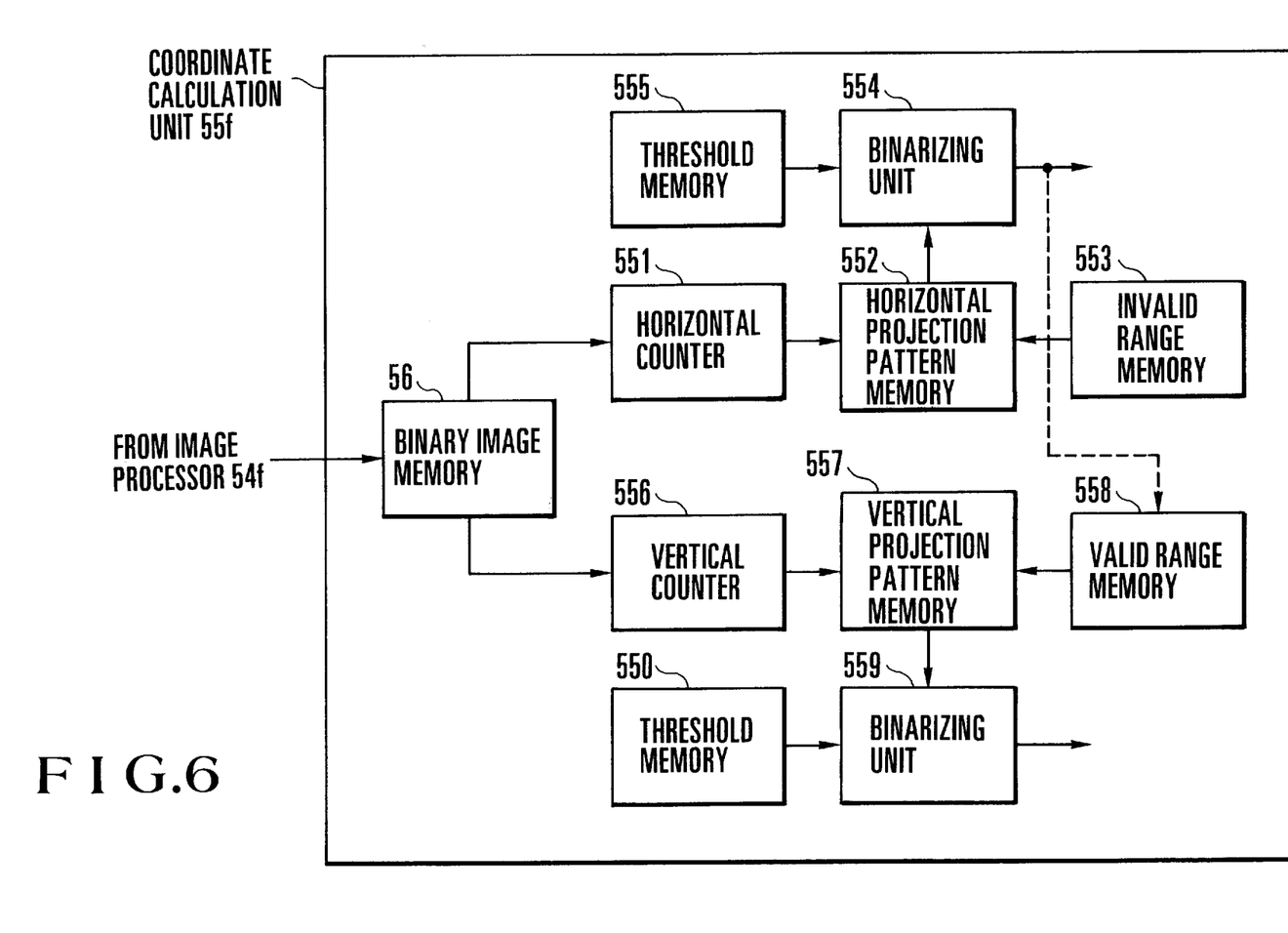
FIG. 6 is a block diagram showing the arrangement of a coordinate calculation unit shown in FIG. 1.

Referring to FIG. 6, the binary image signal from the image processor 54f is input to a binary image memory 56 in the coordinate calculation unit 55f for calculating the coordinate value of the leading end position of the label. A horizontal counter 551 counts the number of white pixels on each horizontal line (i.e., a line perpendicular to the envelope convey direction) of the binary image stored in the binary image memory 56. Count values are sequentially stored in a horizontal projection pattern memory 552.

At this time, information of the leading end portion of the envelope 3 becomes noise and is eliminated from the counting range in accordance with a horizontal projection disable range preset in an invalid range memory 553. The horizontal projection disable range is determined by a distance from the photoelectric detectors 2a and 2b to the visual field of a camera and the speed of the conveyor 1.

Figures 7A, 7B:
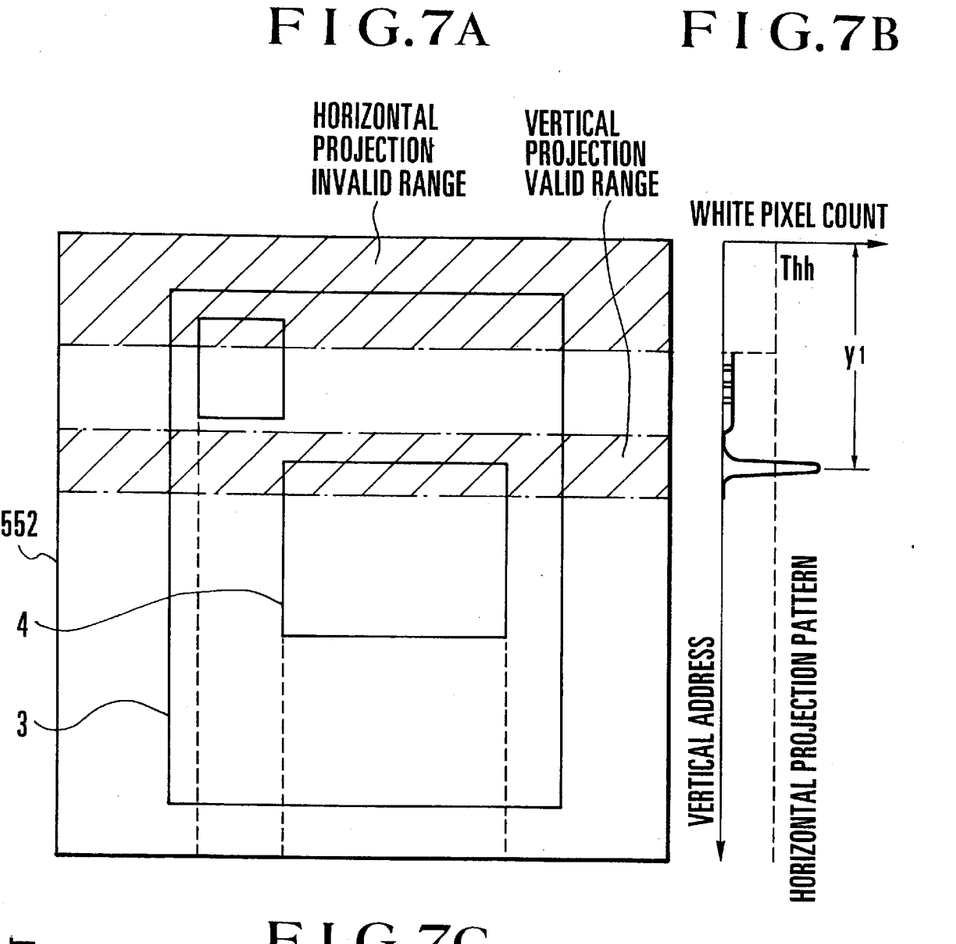
FIG. 7A is a view showing the horizontal and the vertical projection invalid range of binary image data stored in a binary image memory shown in FIG. 6.
FIG. 7B is a view showing a horizontal projection pattern of binary image data stored in a binary image memory shown in FIG. 6.

A horizontal projection pattern shown in FIG. 7B is obtained in the horizontal projection pattern memory 552 FIG. 7A. This horizontal projection pattern data is input to the binarizing unit 554 and binarized using a threshold Thh preset in the threshold memory 555, thereby calculating a vertical address (vertical coordinate value y1) of the leading end of the label 4.

A vertical counter 556 counts the number of white pixels on each vertical line (i.e., a lineparallel to the envelope convey direction). At this time, to improve the detection precision, a target counting range is limited in a vertical projection valid range preset in a valid range memory 558, centered on the calculated vertical address of the leading end of the label 4.

Figure 7C:
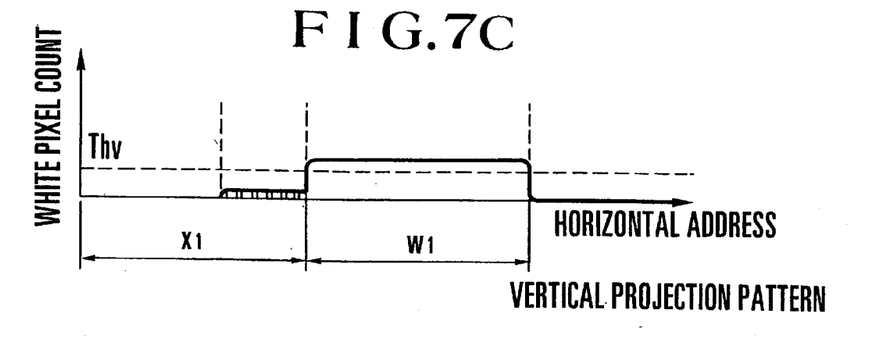
FIG. 7C is a view showing a vertical projection pattern of binary image data stored in a binary image memory shown in FIG. 6.

A vertical projection pattern 557 shown in FIG. 7C is obtained. White pixels in FIG. 7 are expressed in black for illustrative convenience. The vertical projection pattern 557 is binarized by a binarizing unit 559 using a threshold Thv preset in a threshold memory 550. A horizontal coordinate value x1 and a width w1 of the leading end of the label 4 are calculated and output together with the vertical coordinate value y1 of the leading end of the label 4.

The label leading end position detector 5f has been described above. Identical operations are performed by the label trailing end position detector 5r to calculate horizontal and vertical coordinate values x2 and y2 and a width w2 of the trailing end of the label 4. These calculated values are then externally output.

In the above embodiment, the label 4 is adhered to the upper surface of the envelope 3. However, similar detection can be performed even if a window is formed in the envelope 3. An envelope with a window will be described below.

Figure 8A:
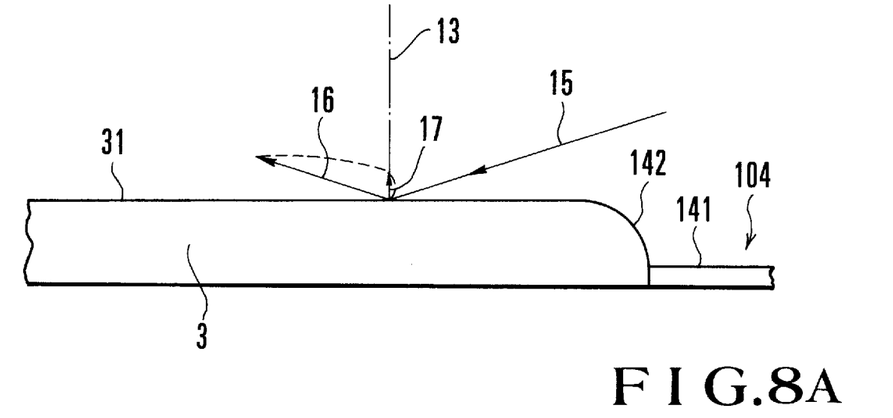
FIGS. 8A to 8C are respectively enlarged views showing the states of a window edge portion when an envelope having a window in place of a label passes across the position of the optical axis of the lens.
Figure 8B:
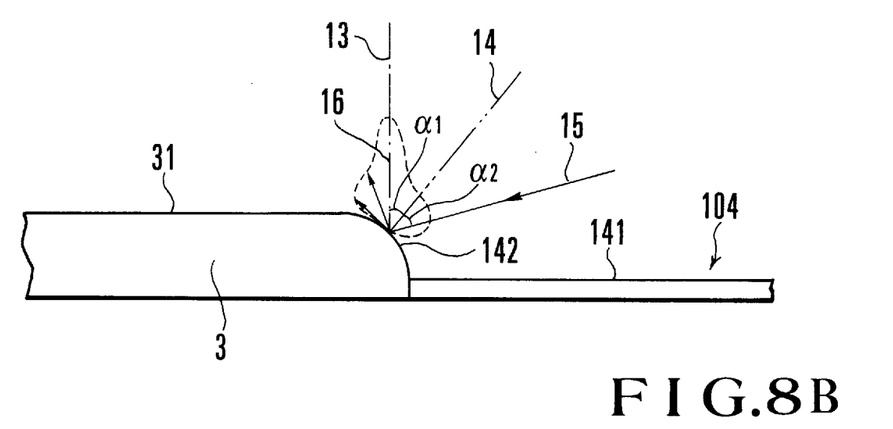
Figure 8C:
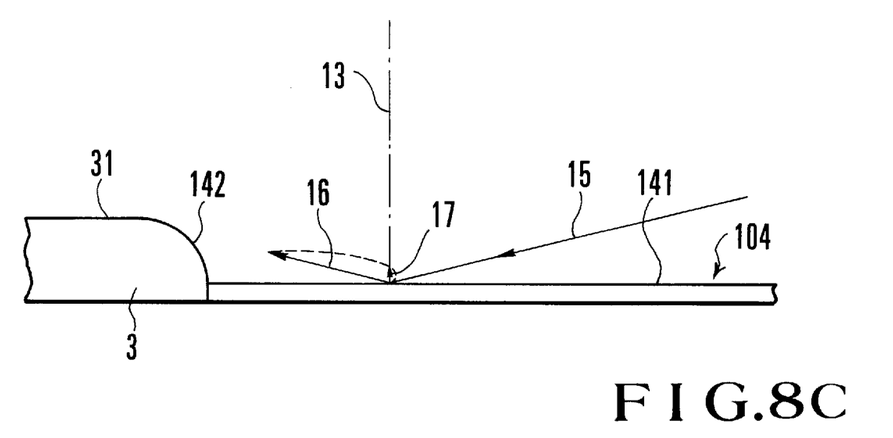

FIGS. 8a, 8b, and 8C show states in which a window frame on an envelope passes the position of the optical axis of a lens during conveyance in FIG. 1. A step shown in FIG. 8A is formed at a window frame 142 of the envelope 3 having a window 104. A normal 14 of a small curved surface of the window frame 142 gradually changes from an almost horizontal state to a vertical state with respect to the envelope surface 31 or the window surface 141 during conveyance of the envelope 3. During this change, there necessarily appears a point at which an angle formed between the optical axis 13 of the lens and the normal 14 to the reflecting surface is set equal to that formed between illumination light 15 and the normal 14 ($\alpha 1 = \alpha 2$), as shown in FIG. 8B.

At this time, light 16 regularly reflected by the window frame 142 is incident on the linear image sensor 53f, and light scattered 17 (see FIGS. 8a and 8c) from a portion of the window surface 141 and a portion of the envelope surface 31 is incident on the linear image sensor 53f. The step portion of the window frame 142 is detected as a highlight region brighter than the background. As in the label 4, the position of the window 104 is detected. In this case, the direction of the step of the window 104 is opposite to that of the label 4 with respect to the convey direction of the envelope 3. For this reason, the trailing end of the window frame 142 is detected by the label leading end position detector 5f, and the leading end position of the window frame 142 is detected by the label trailing end position detector 5r.

Figure 9:
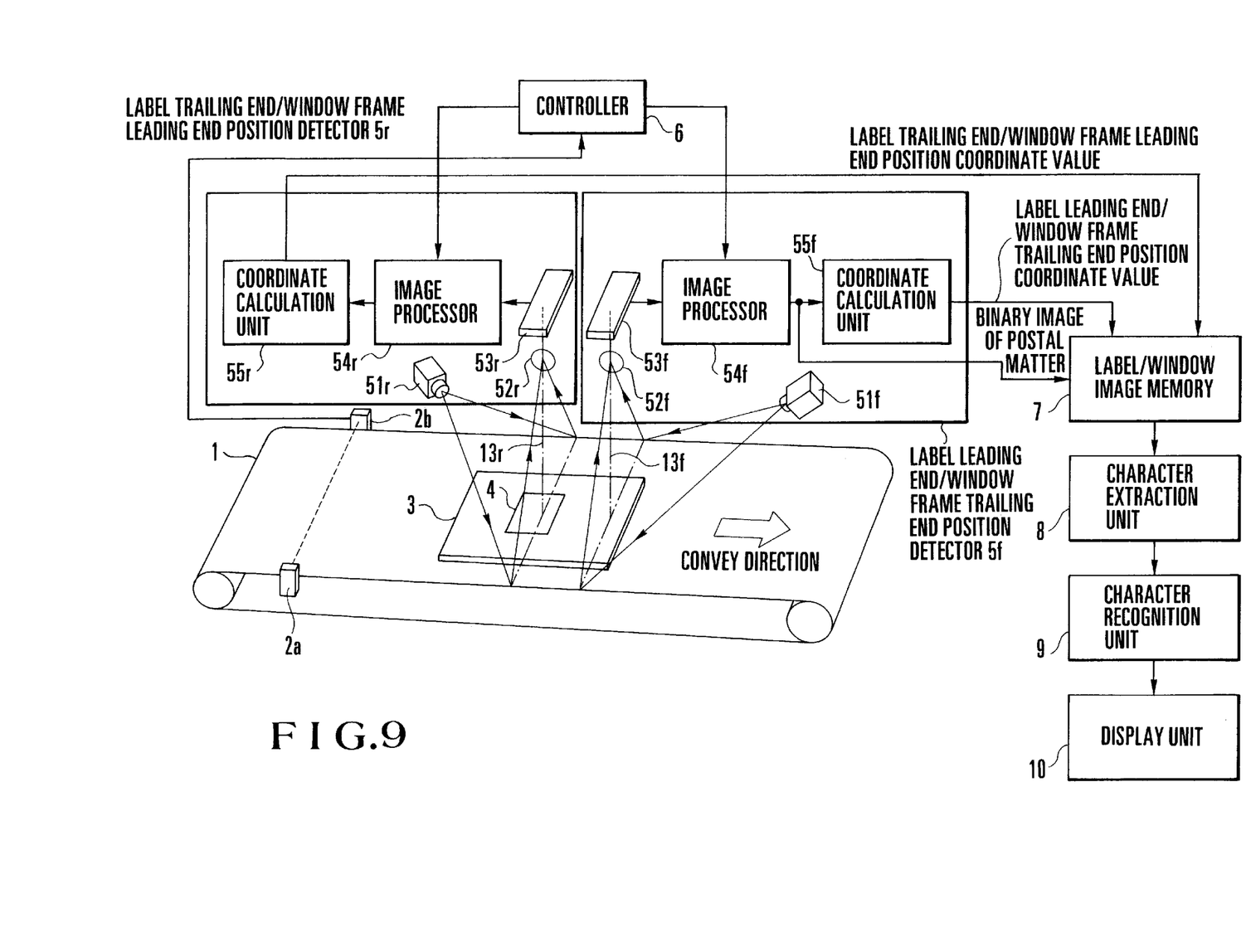
FIG. 9 is an overall block diagram showing an address reading apparatus having a label/window position detecting device of the present invention.

FIG. 9 shows an address reading apparatus obtained by adding a label/window image memory 7, a character extraction unit 8, a character recognition unit 9, and a display unit 10 to the label position detecting device shown in FIG. 1. Referring to FIG. 9, the leading end position of the label 4 and the trailing end position of the window 142 can be selectively detected, so that reference numeral 5f denotes a label leading end/window trailing end position detector. Similarly, since the trailing end position of the label and the leading end position of the window frame can be selectively detected, reference numeral 5r denotes a label trailing end/window frame leading end position detector.

In this address reading apparatus, a label leading end/window frame trailing end position coordinate value output from the label leading end/window frame trailing end position detector 5f, and the label trailing end/window frame leading end position coordinate value output from the label trailing end/window frame leading end position detector 5r are supplied to the label/window image memory 7. An image of the label/window portion is stored in the label/window image memory 7 using the binary envelope image obtained from the output from the image processor 54f in accordance with the label leading end/window frame trailing end position coordinate value and the label trailing end/window frame leading end position coordinate value. The character extraction unit 8 divides an image in units of characters from the images stored in the label/window image memory 7. The character recognition unit 9 performs character recognition of an image in unit of characters, and the character recognition result is displayed on the display unit 10.

The second embodiment of the present invention will be described with reference to FIGS. 10 and 11.

Figure 10:
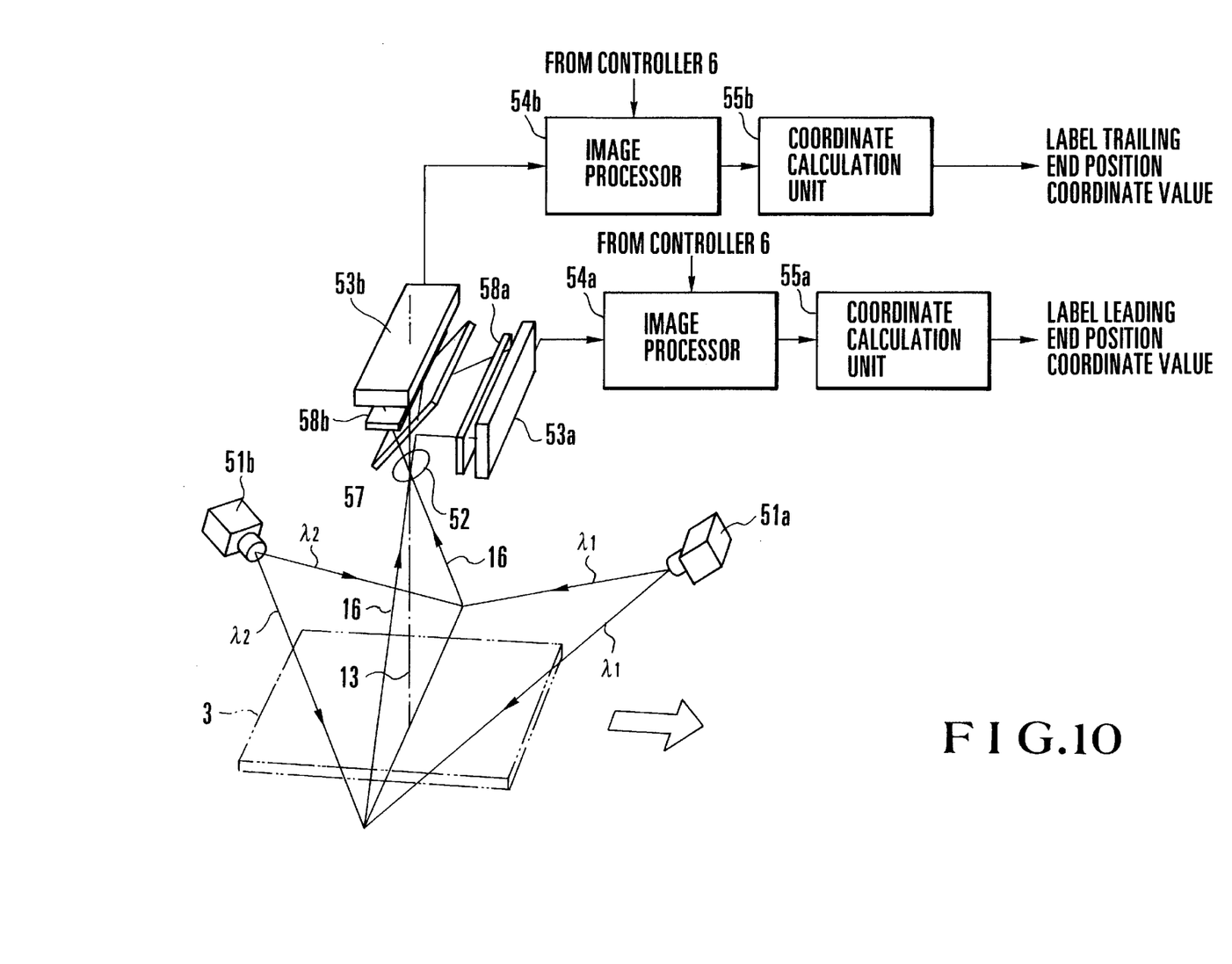
FIG. 10 is a block diagram showing a label position detecting device according to the second embodiment of the present invention.
Figure 11:
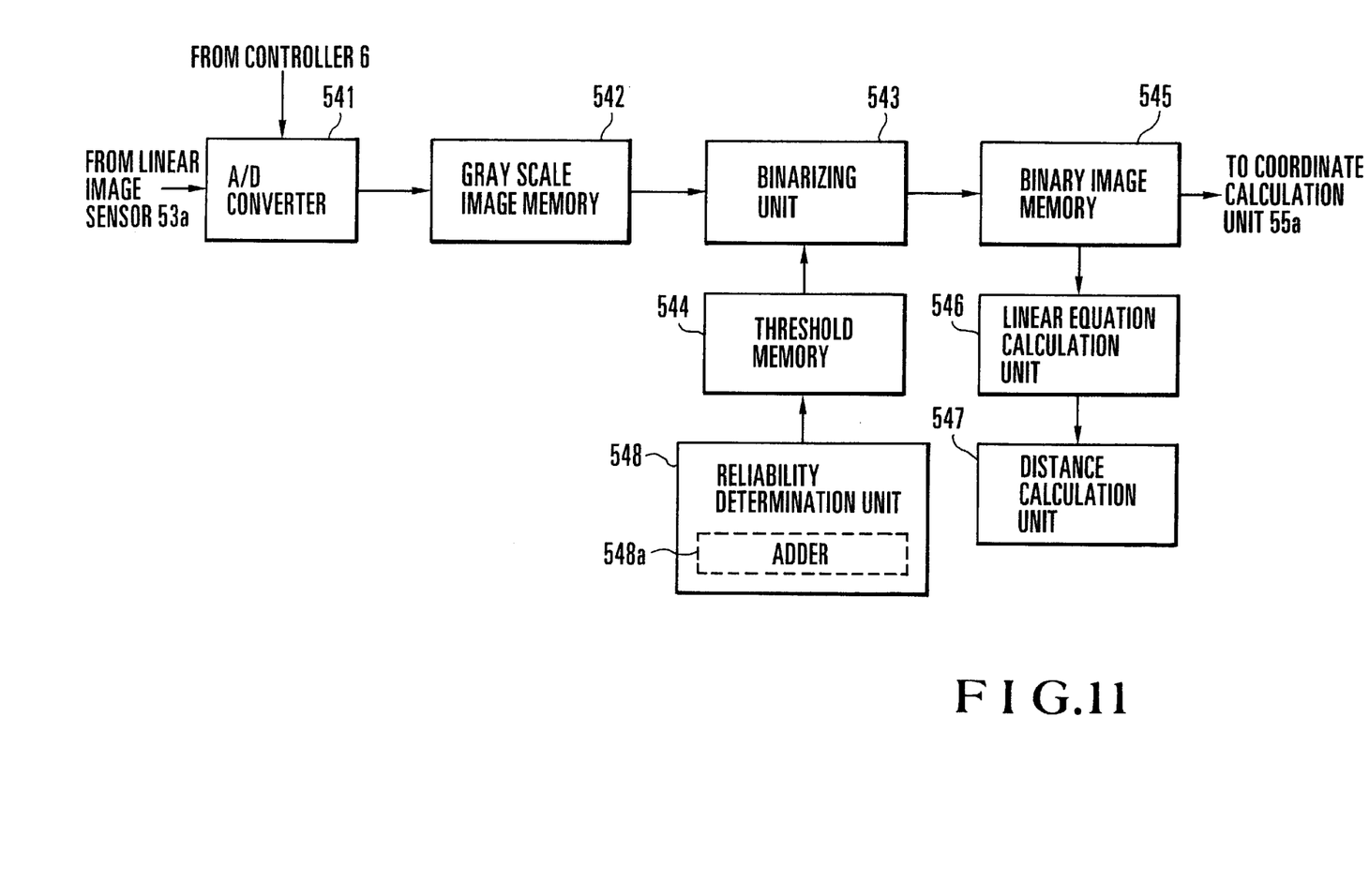
FIG. 11 is a block diagram showing the arrangement of an image processor shown in FIG. 10.

FIG. 10 shows a label position detecting device according to the second embodiment of the present invention, and FIG. 11 shows another arrangement of the image processors in FIGS. 1 and 10.

In the first embodiment shown in FIG. 1, the two lenses 52f and 52r are used to prevent interference between illumination light beams from the two light-emitting elements 51f and 51r, and a gap must be formed between these lenses. To the contrary, in the second embodiment shown in FIG. 10, only one lens 52 is arranged to obtain a compact arrangement.

More specifically, referring to FIG. 10, in the second embodiment, a position detecting device comprises light-emitting elements 51a and 51b, sequentially arranged in the convey direction of an envelope 3 so that the optical axes thereof are perpendicular to each other, for emitting illumination light beams having wavelengths $\lambda 1$ and $\lambda 2$, respectively, a lens 52 arranged such that an optical axis 13 thereof is perpendicular to the surface of the envelope 3, a half mirror 57 arranged such that its surface forms an angle of 45° with the optical axis 13 of the lens 52, bandpass filters 58a and 58b for filtering light (wavelength band $\lambda 1$) reflected by the half mirror 57 and light (wavelength band $\lambda 2$) transmitted through the half mirror 57, respectively, linear image sensors 53a and 53b having sensitivities to only the light (wavelength band λ1) reflected by the half mirror 57 and the light (wavelength band λ2) transmitted through the half mirror 57, respectively, image processors 54a and 54b for processing image signals from the linear image sensors 53a and 53b in accordance with instructions from a controller 6, respectively, and coordinate calculation units 55a and 55b for calculating the coordinate values of the leading and trailing ends of the label from binary images from the image processors 54a and 54b, respectively.

As shown in FIG. 11, in addition to the A/D converter 541, the multi-value (gray scale) image memory 542, the binarizing unit 543, and the threshold memory 544 shown in FIG. 4, the image processor 54a comprises a binary image memory 545 for storing a binary image from the binarizing unit 543, a linear equation calculation unit 546 for calculating a linear equation from the binary image stored in the binary image memory 545, a distance calculation unit 547 for calculating distances between all white pixels and the linear equation calculated by the linear equation calculation unit 546, and an adder 548a for calculating the sum of the distances from the distance calculation unit 547. The position detecting device also includes a reliability determination unit 548 for changing the threshold of the threshold memory 544 when the sum from the adder 548a is larger than a predetermined value.

An operation of the second embodiment will be described with reference to FIG. 10. Light 16 reflected by the envelope upon incidence of illumination light (wavelength band λ1) from the light-emitting element 51a is focused by the lens 52, reflected by the half mirror 57, and incident on the linear image sensor 53a through the filter 58a. On the other hand, light 16 reflected by the envelope 3 upon incidence of illumination light (wavelength band λ2) from the light-emitting elements 51b is focused by the lens 52 and transmitted through the half mirror 57. The light is then incident on the linear image sensor 53b through the filter 58b.

The subsequent processing is identical to that of the first embodiment and will be briefly described. The image processors 54a and 54b process the image signals from the linear image sensors 53a and 53b in accordance with instructions from the controller 6. The coordinate calculation units 55a and 55b calculate the coordinate values of the leading and trailing ends of the label from the binary images from the image processors 54a and 54b and output them to an external device.

A threshold Th (FIG. 5) used to binarize an image in the binarizing unit 543 is determined in the following steps by the image processors 54a and 54b shown in FIG. 11 in the second embodiment. This determination is performed to discriminate whether a binarizing threshold is proper on the basis of the assumption that one side of a label as a detection target is linear.

Figure 12A:
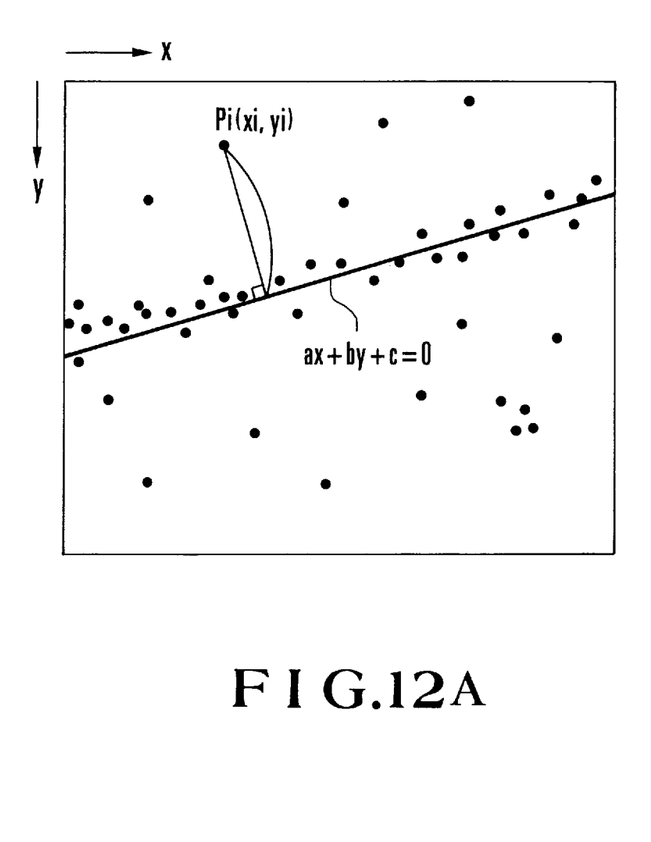
FIGS. 12A and 12B are views showing binary images stored in a binary image memory shown in FIG. 11.
Figure 12B:
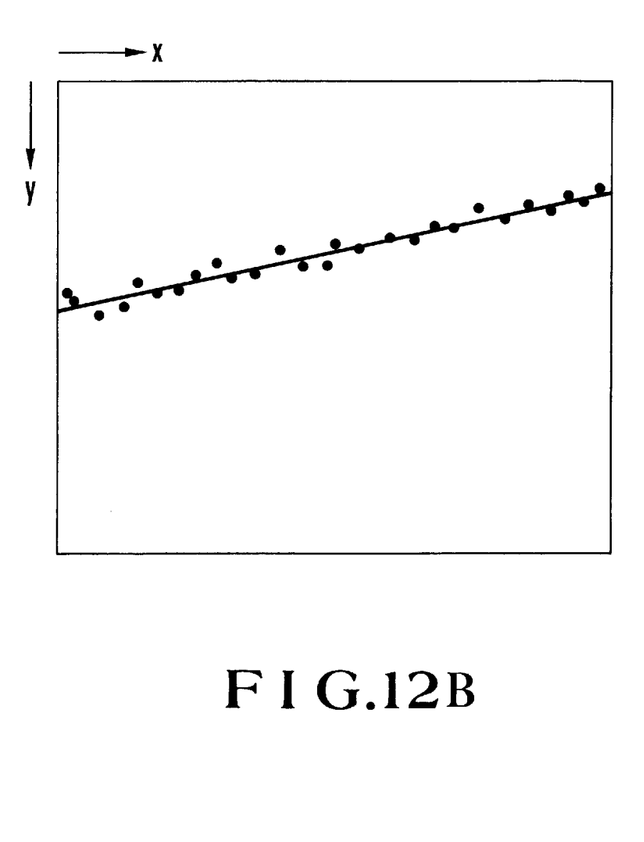

The operation of the arrangement shown in FIG. 11 will be described with reference to FIGS. 12A and 12B. FIGS. 12A and 12B show first and second binary images stored in the binary image memory 545 shown in FIG. 11. White pixels are expressed in black for illustrative convenience. The binary images have different thresholds.

Referring to FIG. 12A, distances between the approximated linear equation and some white pixels are large due to a large number of noise components, and the threshold is regarded to be improper. Referring to FIG. 12B, almost all white pixels overlap the approximated linear equation, and distances between the linear equation and the white pixels are small, so that the threshold is regarded to be proper. Control between the steps is performed by the controller 6.

Step 1
The binarizing unit 543 performs binarization using the initial threshold.

Step 2
The linear equation calculation unit 546 determines linear equation (1) by the method of least squares using the binary image from the binary image memory 545:

$$ax+by+c=0 \tag{1}$$

Step 3
The distance calculation unit 547 calculates shortest distances between the line represented by equation (1) and white pixels Pi(xi,yi), i.e., lengths di of perpendiculars between the line and all the white pixels by equation (2):

$$di=|axi+byi+c|/(a^2+b^2)^{1/2} \tag{2}$$

A sum S of distances di for the white pixels, which are obtained by equation (2), is calculated by the adder 548a as follows:

$$S=\Sigma di \tag{3}$$

Equations (2) and (3) are only measures representing the plausibility of the threshold and may be replaced with other appropriate mathematical expressions.

Step 4
The reliability determination unit 548 compares the sum of the shortest distances obtained in step 3 with a predetermined value. If the sum exceeds the predetermined value, the threshold of the threshold memory 544 is changed. The flow then returns to step 1 to repeat the subsequent operations.

As shown in FIG. 11, by changing the threshold in the threshold memory 544, the position detection precision can become better than that of the arrangement in FIG. 4. More specifically, in the arrangement of FIG. 4, since a fixed threshold prestored in the threshold memory 544 is used to binarize the data, the edge may be blurred, or noise may be superposed on the paper surface. As a result, the position detection precision is degraded. To the contrary, in the arrangement of FIG. 11, since the threshold stored in the threshold memory 544 can be changed to an appropriate value by the linear equation calculation unit 546, the distance calculation unit 547, and the reliability determination unit 548, an appropriate edge image can be obtained, resulting in an improvement of position detection precision.

In the second embodiment, color linear image sensors having characteristics identical to those of filters 58a and 58b may be used in place of the filters 58a and 58b. The same effect as described above can apparently be obtained with use of a dichroic mirror obtained by imparting wavelength selectivity to the half mirror 57. Postal matter is exemplified such that a label is adhered to the surface of an envelope. However, even if a window is formed in an envelope, the position of the window can be detected in the same manner as in FIGS. 8A to 8C.

In each of the first and second embodiments, the linear image sensors are used as photoelectric converting means. However, the same effect as described above can also be obtained even if other photoelectric converting means such as area image sensors or image pickup tubes are used. The image processor shown in FIG. 4 is used in the first embodiment, and the image processor shown in FIG. 11 is used in the second embodiment. However, the image processor in FIG. 11 and the image processor in FIG. 4 may be used in the first and second embodiments, respectively.

As has been apparent from the above description, according to the present invention, even if the reflectance of the background such as an envelope is equal to that of a label, e.g., even if a white label is adhered on a white envelope, the position of the label can be detected.

What is claimed is:

1. A label/window position detecting device comprising:
   convey means for conveying a target object having a label/window;
   light-emitting means for illuminating the target object which is being conveyed by said convey means;
   optical means for forming an image of the target object illuminated with said light-emitting means;
   photoelectric converting means for photoelectrically converting image light incident through said optical means into image signals;
   image processing means for binarizing the image signals obtained from said photoelectric converting means into monochrome binary image signals, using a predetermined threshold; and
   label/window position calculating means for calculating a label/window position of the target object on the basis of the binary image signals from said image processing means, which correspond to at least one of leading and trailing edge portions of the label/window perpendicular to a convey direction of the target object,
   wherein said image processing means comprises:
      a binary image memory for storing the binary images from binarization of the image signals;
      a linear equation calculating means for calculating a linear equation from the binary image signals stored in said binary image memory;
      distance calculating means for calculating distances between all white pixels and the linear equation calculated by said linear equation calculating means;
      adding means for calculating a sum of the distances calculated by said distance calculating means; and
      reliability determining means for changing the predetermined threshold when the sum from said adding means exceeds a predetermined value.

2. A device according to claim 1, wherein said image processing means comprises an A/D converter for A/D-converting the image signals obtained from said photoelectric converting means into quantized image signals, a multi-value image memory for storing the quantized image signals from said A/D converter, a threshold memory for prestoring the predetermined threshold, and binarizing means for binarizing the quantized image signals stored in said multi-value image memory into binary signals using the predetermined threshold, and outputting the binary image signals.

3. A device according to claim 1, wherein said label/window position calculating means comprises a binary image memory for storing the binary image signals from said image processing means, a horizontal counter for counting either white or black pixels of a horizontal line perpendicular to a convey direction of the target object on the basis of the binary image signals stored in said binary image memory, a horizontal projection pattern memory for storing a count result from said horizontal counter in units of lines, and vertical address calculating means for binarizing the pattern data from said horizontal projection pattern memory using the predetermined threshold to calculate a label/window leading end vertical address.

4. A device according to claim 3, further comprising an invalid range memory for presetting an invalid range including a leading end portion of the target object, and wherein said horizontal projection pattern memory stores a counter result of said horizontal counter except for horizontal lines included in an invalid range portion set in said invalid range memory.

5. A device according to claim 3, wherein said label/window position calculating means comprises a vertical counter for counting either white or black pixels of a vertical line parallel to the convey direction of the target object on the basis of the binary image signals stored in said binary image memory, a vertical projection pattern memory for storing a count result of said vertical counter in units of lines, and horizontal address calculating means for binarizing the pattern data from said vertical projection pattern memory using the predetermined threshold to calculate a label/window leading end horizontal address.

6. A device according to claim 5, further comprising a valid range memory for setting a valid range for position retrieval on the basis of the label/window leading end vertical address calculated by said vertical address calculating means, and wherein said vertical projection pattern memory stores a counter result of said vertical counter which corresponds to only a vertical line included in a valid range portion set in said valid range memory.

7. A device according to claim 1, wherein the light emitted from said light-emitting means is convergent light focused on the target object.

8. A device according to claim 1, wherein said photoelectric converting means comprises one of a linear image sensor and an image pickup tube.

9. A device according to claim 1, further comprising:
   a controller for controlling image processing operations; and
   photoelectric means for detecting passage of the target object and supplying an image reception timing signal to said controller to trigger control of the image processing operations.

10. A device according to claim 1, wherein said light-emitting means comprises a pair of light-emitting elements arranged to oppose each other such that optical axes thereof are in parallel to the conveying direction of the target object, one of the optical axes being substantially perpendicular to another optical axis on the target object which is being conveyed, and said optical means comprises a pair of lenses for focusing regularly reflected components of light emitted from said light-emitting elements at leading and trailing edge portions of the label/window.

11. A device according to claim 10, wherein said photoelectric converting means comprises a pair of photosensor units for photoelectrically converting the regularly reflected components from the leading and trailing edge portions of the label/window which are focused by lenses, said image processing means comprising a pair of image processors for binarizing image signals from said photosensor units into binary image signals using the predetermined threshold, and said label/window position calculating means comprises a pair of coordinate calculating units for calculating coordinates of the leading and trailing edge portions of the label/window on the basis of the binary image signals from said image processors.

12. A label/window position detecting device comprising:
   convey means for conveying a target object having a label/window;
   light-emitting means for illuminating the target object which is being conveyed by said convey means;
      wherein said light-emitting means comprises a plurality of light-transmitting portions for emitting light components having specific wavelength bands different from each other;
   optical means for forming images of the target object illuminated with said light-emitting means;

photoelectric converting means for photoelectrically converting image light incident through said optical means into image signals;
    wherein said photoelectric converting means comprises a plurality of photosensor units having sensitivities to only the light components having the specific wavelength ranges from said light-emitting portions;
image processing means for binarizing the image signals obtained from said photoelectric converting means into monochrome binary image signals, using a predetermined threshold;
label/window position calculating means for calculating a label/window position of the target object on the basis of the binary image signals from said image processing means, which correspond to at least one of leading and trailing edge portions of the label/window perpendicular to a convey direction of the target object;

a half mirror for reflecting and transmitting the light components having the specific wavelength bands from said plurality of light-emitting portions through said optical means upon reflection by the target object; and
a pair of optical filters for filtering only the light components having the specific wavelength bands different from each other from light reflected by said half mirror and light transmitted through said half mirror;
    wherein said photoelectric converting means comprises a pair of photoelectric converting elements, having sensitivities to only the light components having specific wavelength bands which have passed through said optical filters, for outputting photoelectrically converted image signals respectively representing leading and trailing end positions of the label/window.

* * * * *